(12) United States Patent
Terruzzi et al.

(10) Patent No.: US 8,792,761 B2
(45) Date of Patent: Jul. 29, 2014

(54) OPTICAL FIBER WITH SINGLE COATING

(75) Inventors: Lidia Terruzzi, Milan (IT); Johannes Adrianus Van Eekelen, Rozenburg (NL); Sabrina Fogliani, Milan (IT)

(73) Assignee: Prysmian S.p.A., Milan (IT)

( * ) Notice: Subject to any disclaimer, the term of this patent is extended or adjusted under 35 U.S.C. 154(b) by 207 days.

(21) Appl. No.: 13/265,765

(22) PCT Filed: Apr. 23, 2009

(86) PCT No.: PCT/EP2009/054905
§ 371 (c)(1),
(2), (4) Date: Jan. 3, 2012

(87) PCT Pub. No.: WO2010/121659
PCT Pub. Date: Oct. 28, 2010

(65) Prior Publication Data
US 2012/0093470 A1    Apr. 19, 2012

(51) Int. Cl.
*G02B 6/02* (2006.01)

(52) U.S. Cl.
USPC .................................................... 385/123

(58) Field of Classification Search
USPC .................................................... 385/123
See application file for complete search history.

(56) References Cited

U.S. PATENT DOCUMENTS

| | | |
|---|---|---|
| 4,682,850 A | 7/1987 | White et al. |
| 4,690,501 A | 9/1987 | Zimmerman et al. |
| 4,690,502 A | 9/1987 | Zimmerman et al. |
| 4,741,596 A | 5/1988 | Broer et al. |
| 4,794,133 A | 12/1988 | Moschovis et al. |
| 4,798,852 A | 1/1989 | Zimmerman et al. |
| 4,806,574 A | 2/1989 | Krajewski et al. |
| 4,932,750 A | 6/1990 | Ansel et al. |
| 6,638,616 B2 | 10/2003 | Tortorello et al. |
| 2003/0119934 A1 | 6/2003 | Hu |
| 2003/0139487 A1 | 7/2003 | Montgomery et al. |
| 2006/0072889 A1 | 4/2006 | Roba et al. |
| 2006/0127019 A1 | 6/2006 | Castellani et al. |
| 2007/0263972 A1 | 11/2007 | Roba et al. |

FOREIGN PATENT DOCUMENTS

| | | |
|---|---|---|
| EP | 0 167 199 A1 | 1/1986 |
| EP | 0 208 845 A1 | 1/1987 |
| EP | 0 210 339 A2 | 2/1987 |
| EP | 1 112 979 A1 | 7/2001 |
| EP | 1 209 132 A1 | 5/2002 |
| WO | WO 96/11965 A1 | 4/1996 |
| WO | WO 98/50317 A1 | 11/1998 |
| WO | WO 99/26891 A1 | 6/1999 |
| WO | WO 99/67180 A1 | 12/1999 |
| WO | WO 01/05724 A2 | 1/2001 |
| WO | WO 03/037997 A2 | 5/2003 |
| WO | WO 03/091177 A1 | 11/2003 |
| WO | WO 2004/010179 A1 | 1/2004 |
| WO | WO 2004/031091 A1 | 4/2004 |
| WO | WO 2004/037739 A1 | 5/2004 |

OTHER PUBLICATIONS

International Search Report from the European Patent Office for International Application No. PCT/EP2009/054905, mailing date Apr. 19, 2010.
Grasso et al.; "Microbending Losses of Cabled Single-Mode Fibers", ECOC '88, pp. 526-532, (1988).
Draft IEC Standard 62221, Technical Report, TR3 Ed. 1: "Type 3: Microbending Sensitivity", pp. 1-13, (2001).
IEC 60793-1-32, Ed. 1: Optical Fibres—Part 1-32: "Measurement Methods and Test Procedures—Coating Strippability", pp. 1-9, (2001).

*Primary Examiner* — Jerry Rahll
(74) *Attorney, Agent, or Firm* — Finnegan, Henderson, Farabow, Garrett & Dunner, L.L.P.

(57) ABSTRACT

An optical fiber includes a glass core and a protective coating consisting of a single coating layer disposed to surround the glass core, wherein the single coating layer is formed from a cured polymeric material obtained by curing a radiation curable composition including: (i) a radiation curable urethane (meth)acrylate oligomer, preferably including a backbone derived from polyoxytetramethylene glycol, (ii) at least one monofunctional reactive monomer, (iii) at least one multifunctional reactive monomer, and (iv) an adhesion promoter.

15 Claims, 2 Drawing Sheets

OPTICAL FIBER WITH SINGLE COATING

CROSS REFERENCE TO RELATED APPLICATION

This application is a national phase application based on PCT/EP2009/054905, filed Apr. 23, 2009, the content of which is incorporated herein by reference.

FIELD OF THE INVENTION

The present invention relates to an optical fiber having a single coating.

More in particular, the present invention relates to an optical fiber comprising a core inside which the optical signal is transmitted and a single coating of crosslinked polymeric material based on urethane(meth)acrylate.

STATE OF THE ART

Optical fibers commonly comprise a core inside which the transmitted optical signal is transmitted, surrounded by a cladding, both core and cladding being typically of glass and forming the optical waveguide (typically with a diameter of about 120-130 µm). The optical waveguide is typically protected by an outer coating, typically of polymeric material. This protective coating generally comprises a first coating layer positioned directly onto the glass surface, also known as the "primary coating", and of at least a second coating layer, also known as "secondary coating", disposed to surround said first coating layer. In the art, the combination of primary coating and secondary coating is sometimes also identified as "coating system", as both these layers are generally applied during the drawing manufacturing process of the fiber, in contrast with the "secondary coating system" which comprises coating layers optionally applied subsequently.

The thickness of the primary coating typically ranges from about 25 µm to about 35 µm, while the thickness of the secondary coating typically ranges from about 10 µm to about 30 µm.

These polymer coatings may be obtained from compositions comprising oligomers and monomers that are generally crosslinked by means of UV irradiation in the presence of a suitable photo-initiator. The two coatings described above differ, inter alia, in the mechanical properties of the respective materials. Whereas the material which forms the primary coating is a relatively soft material, with a relatively low modulus of elasticity at room temperature, the material which forms the secondary coating is relatively harder, having higher modulus of elasticity values at room temperature. The primary coating system is selected to provide environmental protection to the optical waveguide and resistance, inter alia, to the well-known phenomenon of microbending, which can lead to attenuation of the signal transmission capability of the fiber and is therefore undesirable. In addition, the primary coating system is designed to provide the desired resistance to physical handling forces, such as those encountered when the fiber is submitted to cabling operations.

In addition, as the operator needs to identify different fibers with certainty when a plurality of fibers is contained in the same housing, it is convenient to color the various fibers with different identifying colors. Typically, an optical fiber is color-identified by surrounding the secondary coating with a third colored polymer layer, commonly known as "ink", having a thickness typically of between about 2 µm and about 10 µm, or alternatively by introducing a colored pigment directly into the composition of the secondary coating.

It is known in the art to produce optical fibers with a primary coating system comprising a single coating layer satisfying both the requirements of the above described primary and secondary layers known in the art.

The production of an optical fiber with a single coating layer would allow to reduce the manufacturing costs, to increase the productivity, as well as to reduce the number of interfaces between different material possibly yielding delamination especially in harsh environmental conditions such as high temperature or dump, of the optical fiber.

Several attempts have been made to satisfy such a goal.

Examples of radiation-curable coating compositions particularly adapted for the single coat coating of optical fibers are disclosed, for example in U.S. Pat. No. 4,932,750. These comprise (1) from 65% to 85% of a diethylenic-terminated polyurethane, which may contain urea groups, the polyurethane being based on a diisocyanate having an average molecular weight of from 400 to 5000; and (2) from 5% to 25% of an ether of a $C_2$-$C_4$ alkylene glycol monoester of a monoethylenically unsaturated monocarboxylic acid, the ether being selected from the group consisting of ethoxyethyl, dicyclopentenyl, phenyl, and mixtures thereof. Ethoxyethoxyethyl acrylate is particularly preferred, and a triacrylate ester, such as trimethylol propane triacrylate, is also desirably present.

U.S. Pat. No. 4,682,850 discloses optical fibers having a core coated with only a single ultraviolet-cured material having tensile modulus in the range of about 1,000 to about 10,000 psi and preferably a Shore A hardness of about 70 to about 75. An example of a resin usable for coating was indicated as manufactured by De Soto, Inc. of Des Plains, Ill., under the designation De Soto 131.

U.S. Pat. No. 4,798,852 discloses optical fibers provided with a single coating obtained by a radiation-curable polymeric composition consisting of a polyacrylate-terminated oligomer which contains a plurality of urethane and/or urea groups and which is formed from an organic diisocyanate in an amount sufficient to react with a hydroxyl or amine functional polymer having a functionality of two, three or four, or a monohydric acrylate.

International Patent Publication WO2004/031091 discloses an optical fiber comprising: a) a glass portion; b) at least one protective coating layer disposed to surround said glass portion; said protective coating layer having a modulus of elasticity value between −40° C. and +60° C. comprised between 5 MPa and 600 MPa, preferably not higher than 500 MPa, more preferably not higher than 450 MPa, much more preferably not higher than 300. Preferably, said protective coating layer is a single protective coating layer which is disposed in contact with said glass portion. More in particular, the protective coating is obtained by curing a radiation curable composition comprising: (a) from 50% by weight to 95% by weight of at least one ethylenically unsaturated polyurethane obtained by reacting the following compounds: (A) at least one polyol compound, (B) at least one polyisocyanate compound; and (C) at least one (meth)acrylate compound containing at least one hydroxyl group; and (b) from 5% by weight to 50% by weight of at least one polyfunctional reactive diluent monomer.

U.S. Pat. No. 6,638,616 discloses a radiation-curable solvent-free coating composition for optical fiber having a radiation-curable urethane(meth)acrylate oligomer comprising an alkyd backbone, a reactive diluent, and a photoinitiator, and optionally an additive. The alkyd backbone is derived from an alkyd resin, a polyester resin having pendant ester group protruding off of a main polymer chain of ester linkages.

SUMMARY OF THE INVENTION

As noticed by the Applicant, the materials known in the art do not fully satisfy all the requirements that a single coating layer need to have.

In particular, a coating composition employed to realize the single coating layer should have, once cured, an elastic tensile modulus relatively low to allow a good adhesion of the cured polymeric material to the glass fiber and to reduce the microbending losses, but sufficiently high to confer the necessary mechanical strength.

The value of the elastic tensile modulus should be relatively constant over a wide range of temperatures, i.e., from a temperature well below 0° C., e.g. −30° C., to a temperature well above 0° C., e.g. +60° C.

Moreover, the Applicant has noticed that the coating composition employed to realize the single coating layer should have, at the application on the glass portion of the optical fiber, a value of viscosity relatively low to improve the application of the coating material on the glass core during the manufacturing. The improved interaction between coating material and glass core during manufacturing brings to increase both the adhesion properties and the resistance to ageing, even in harsh environmental conditions (measurable after curing the material). More specifically, the viscosity of the coating composition should be such to provide a suitable adhesion to the glass portion, but not so high to impair (decrease) the speed of the drawing of the optical fiber Thus, as observed by the applicant, what seems important for a single coating optical fiber is the control of the viscosity value of the coating composition to be employed for the coating and the tensile modulus of the cured polymeric material.

In the present description and claims, the term "elastic tensile modulus" is referred to the modulus of a polymeric material as determined by means of a DMA test in tension, as illustrated in detail in the test method section of the experimental part of the present specification.

In the present description and claims, the term "viscosity" is referred to the viscosity of a coating composition in uncured form at the conditions of the application onto the glass portion of the optical fiber. The viscosity is determined by means of a Brookfield method using a Brookfield viscometer RVT pr RVTD with a constant temperature bath of 25±0.2° C.

According to a first aspect, the present invention relates to an optical fiber comprising a glass core and a protective coating consisting of a single coating layer disposed to surround said glass core, wherein said single coating layer is formed from a cured polymeric material obtained by curing a radiation curable composition comprising (i) a radiation curable urethane(meth)acrylate oligomer, preferably comprising a backbone derived from polyoxytetramethylene glycol, (ii) at least one monofunctional reactive monomer, (iii) at least one multifunctional reactive monomer, and (iv) an adhesion promoter, said radiation curable composition having a viscosity lower than 4000 mPa·s, said polymeric material having a tensile modulus at 40° C. lower than 20 MPa and a tensile modulus at −40° C. lower than 300 MPa.

As protective coating is intended a layer of material provided in a radial external position with respect to the glass core, in direct contact thereto, having the function of cushioning the glass core. The single coating layer constituting the protective coating can have a thickness of from 25 μm to 65 μm, preferably of from 30 μm to 60 μm.

Optionally, the optical fiber of the invention can comprise a color coating in a radial external position with respect to the protective coating. Typically, said color coating has a thickness of from 2 μm to 10 μm, and it is provided for identification purposes.

According to a preferred embodiment the glass transition temperature of the said cured polymeric material is not higher than about −80° C.

Preferably, a single coating optical fiber according to the invention shows a microbending sensitivity at 1550 nm in a range of temperature from −30° C. to 60° C. less than 7 (dB/km)(g/mm), more preferably of less than 5, when subjected to the expandable drum microbending test.

Preferably, the optical fiber of the invention is a standard single mode fiber. The term standard single mode fiber refers herein to optical fibers having a refractive index profile of the step-index kind, i.e. a single segment profile, with a single variation of the refractive index of 0.2%-0.4%, a core radius of about 4.0-4.5 μm and a MAC value of about 7.8-8.6.

Preferably, the radiation curable composition employed to form the single coating layer of the optical fiber of the invention has a viscosity lower than 3800 mPa·s, more preferably lower than 3600 mPa·s, and still more preferably ranging from 2800 mPa·s to 3600 mPa·s.

Advantageously, the cured polymeric material forming the single coating layer of the optical fiber of the invention has an elongation at break greater than 50%, more preferably equal to or lower than 100%.

According to another aspect, the present invention relates to an optical fiber comprising a glass core and a protective coating consisting of a single coating layer disposed to surround said glass core, wherein said single coating layer is made of a cured polymeric material, obtained by curing a radiation curable composition comprising (i) a radiation curable urethane(meth)acrylate oligomer, preferably comprising a backbone derived from polyoxytetramethylene glycol, (ii) at least one monofunctional reactive monomer, (iii) at least one multifunctional reactive monomer, and (iv) an adhesion promoter in an amount higher than 5 wt. % of the total amount of said radiation curable composition, said single coating layer having a tensile modulus at 40° C. lower than 20 MPa and a tensile modulus at −40° C. lower than 300 MPa.

In the present description and claims, unless otherwise stated the amount expressed as wt % of a component is with respect to the total amount of the composition comprising the component in question.

Preferably, the radiation curable composition employed to form the single coating layer of the optical fiber of the invention comprises an adhesion promoter in an amount higher than 9 wt. %, more preferably higher than 12 wt. % of the total amount of said radiation curable composition.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

DESCRIPTION OF PREFERRED EMBODIMENTS

Figure 1:
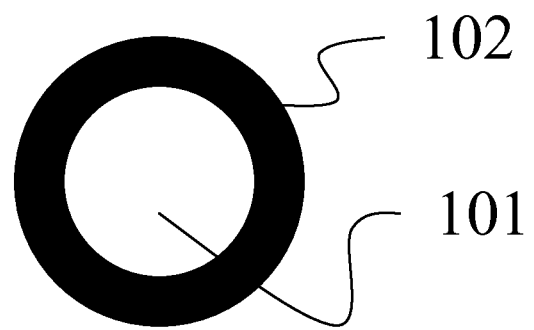
FIG. 1 shows a schematic cross-section of an optical fiber according to the invention.

As shown in FIG. 1, an optical fiber according to the invention comprises a glass portion 101 and a coating system consisting of a single coating layer 102 disposed to surround said glass portion 101.

Radiation-curable carrier systems which are suitable for forming a composition to be used as coating system consisting of a single coating layer in an optical fiber according to the invention contain one or more radiation-curable oligomers and one or more mono- and multi-functional reactive monomers having at least one functional group capable of polymerization when exposed to actinic radiation. The radiation-curable functionality used can be ethylenic unsaturation, which can be polymerized preferably through radical polymerization. Preferably, at least about 80 mole %, more preferably, at least about 90 mole %, and most preferably substantially all of the radiation-curable functional groups present in the oligomer are acrylate or methacrylate.

A coating system consisting of a single coating layer according to the present invention is made from a radiation curable coating composition comprising a radiation curable oligomer (i), said oligomer preferably comprising a backbone derived from polyoxytetramethylene glycol. Preferably, the oligomer is a urethane(meth)acrylate oligomer comprising said backbone, more preferably a wholly aliphatic urethane (meth)acrylate oligomer.

The oligomer (i) can be made according to methods that are well known in the art. Preferably, the urethane(meth)acrylate oligomer can be prepared by reacting (A) the polyoxytetramethylene glycol,
(B) a polyisocyanate, and
(C) a (meth)acrylate containing a hydroxyl group.

Examples of the process for manufacturing the urethane (meth)acrylate by reacting these compounds comprise the steps of (i) reacting said glycol, the polyisocyanate, and the hydroxyl group-containing (meth)acrylate altogether; or (ii) reacting said glycol and the polyisocyanate, and reacting the resulting product with the hydroxyl group-containing (meth)acrylate; or (iii) reacting the polyisocyanate and the hydroxyl group-containing (meth)acrylate, and reacting the resulting product with said glycol; or (iv) reacting the polyisocyanate and the hydroxyl group-containing (meth)acrylate, reacting the resulting product with said glycol, and reacting the hydroxyl group-containing (meth)acrylate once more.

In the present description and claims, as polyoxytetramethylene glycol (A) is intended compound comprising a plurality of tetramethylene glycol moieties. Preferably, said polyoxytetra-methylene glycol has on average a number average molecular weight ranging from 500 to 10,000 g/mol, more preferably ranging from 1,000 to 8,000 g/mol, even more preferred from 1,500 to 4,000 g/mol, and most preferred from 1,500 to 3,000 g/mol. According to a preferred embodiment, the amount of unsaturation (referred to the meq/g unsaturation for the total composition) of said polyoxytetramethylene glycol is less than 0.01 meq/g, more preferably of from 0.0001 to 0.009 meq/g.

Polyoxytetramethylene glycol includes 1,4-polyoxytetramethylene glycol, 2-methyl-1,4-polyoxytetramethylene glycol, 3-methyl-1,4-polyoxytetramethylene glycol, and mixtures thereof.

Given as examples of the polyisocyanate (B) are 2,4-tolylene diisocyanate, 2,6-tolylene diisocyanate, 1,3-xylylene diisocyan-ate, 1,4-xylylene diisocyanate, 1,5-naphthalene diisocyanate, m-phenylene diisocyanate, p-phenylene diisocyanate, 3,3'-dimeth-yl-4,4'-diphenylmethane diisocyanate, 4,4'-diphenylmethane di-isocyanate, 3,3'-dimethylphenylene diisocyanate, 4,4'-biphenyl-ene diisocyanate, 1,6-hexane diisocyanate, isophorone diisocyan-ate, methylenebis(4-cyclohexylisocyanate), 2,2,4-trimethylhexa-methylene diisocyanate, bis(2-isocyanatethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, and the like. These polyisocyanate compounds may be used either individually or in combinations of two or more. Preferred isocyanates are tolylene di-isocyanate, isophorone di-isocyanate, and methylene-bis(4-cyclohexylisocyanate). Most preferred are wholly aliphatic based polyisocyanate compounds, such as isophorone di-isocyanate, and methylene-bis(4-cyclo-hexylisocyanate).

Examples of the hydroxyl group-containing (meth)acrylate (C) include (meth)acrylates derived from (meth)acrylic acid and epoxy and (meth)acrylates comprising alkylene oxides, more in particular, 2-hydroxyethyl(meth)acrylate, 2-hydroxypropyl-acrylate and 2-hydroxy-3-oxyphenyl (meth)acrylate. Acrylate functional groups are preferred over methacrylates.

The ratio of the polyoxytetramethylene glycol (A), the polyisocyanate (B), and the hydroxyl group-containing (meth)acrylate (C) used for preparing the urethane(meth) acrylate is determined so that 1.1 to 3 equivalents of an isocyanate group included in the polyisocyanate and 0.1 to 1.5 equivalents of a hydroxyl group included in the hydroxyl group-containing (meth)acrylate are used for one equivalent of the hydroxyl group included in the polyoxytetramethylene glycol.

The number average molecular weight of the urethane (meth)acrylate oligomer used in the radiation curable composition useful in the present invention is preferably in the range from 1200 to 20,000 g/mol, and more preferably from 2,200 to 10,000 g/mol. If the number average molecular weight of the urethane(meth)acrylate is less than 100, the radiation curable composition tends to solidify; on the other hand, if the number average molecular weight is larger than 20,000, the viscosity of the radiation curable composition becomes high, making handling of the composition difficult.

The urethane(meth)acrylate oligomer is preferably used in an amount from 20 to 80 wt %, more preferably from 30 to 70 wt. %, and most preferred from 40 to 70 wt. % of the total amount of the radiation curable composition. The range from 40 to 70 wt. % is particularly preferable to enable a suitable coating process (in term of drawing speed and adhesion to the glass portion), as well as superior flexibility and long-term reliability of the cured coating.

A radiation-curable composition to be applied as coating system consisting of a single coating layer on an optical fiber according to the invention also contains one or more monofunctional reactive monomers (ii). The monofunctional reactive monomer can be a low viscosity monomer having one functional group capable of polymerization when exposed to actinic radiation. For example, the viscosity of a low viscosity monomer is from 50 to 500 centipoise at 25° C. The functional group may be of the same nature as that used in the radiation-curable oligomer. Preferably, the functional group of each monofunctional reactive monomer is capable of copolymerizing with the radiation-curable functional group present on the other radiation-curable monomers or oligomer.

According to a preferred embodiment, the polymeric material applied as coating system on an optical fiber according to the invention is made from a radiation curable composition comprising (ii) at least one monofunctional reactive monomer (having an acrylate or vinyl functionality), said monofunctional monomer(s) being present in amounts ranging from 10 to 50 wt. %, preferably ranging from 15 to 45 wt. %, more preferably from 20 to 30 wt. %.

For example, the monofunctional reactive monomer can be a monomer or a mixture of monomers having an acrylate or vinyl functionality and a $C_4$-$C_{20}$ alkyl or polyether moiety.

Examples of acrylate monofunctional monomers are acrylates containing an alicyclic structure such as isobornyl acrylate, bornyl acrylate, dicyclopentanyl acrylate, cyclohexyl acrylate, and the like, 2-hydroxyethyl acrylate, 2-hydroxypropyl acrylate, 2-hydroxybutyl acrylate, methyl acrylate, ethyl acrylate, propyl acrylate, iso-propyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, stearyl acrylate, iso-stearyl acrylate, tetrahydrofurfuryl acrylate, butoxyethyl acrylate, ethoxydiethylene glycol acrylate, benzylacrylate, phenoxy-ethylacrylate, polyethylene glycol monoacrylate, polypropylene glycol monoacrylate, methoxyethylene glycol acrylate, ethoxy-ethyl acrylate, methoxypolyethylene glycol acrylate, methoxy-propylene glycol acrylate, dimethylaminoethyl acrylate, diethyl-aminoethyl acrylate, 7-amino-3,7-dimethyloctyl acrylate, acryl-ate monomers shown by the following formula (1)

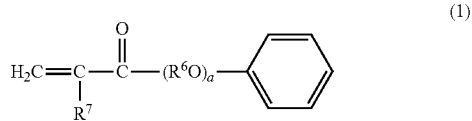

(1)

wherein $R^7$ is a hydrogen atom or a methyl group, $R^8$ is an alkylene group having 2-6, and preferably 2-4 carbon atoms, $R^9$ is a hydrogen atom or an organic group containing 1-12 carbon atoms or an aromatic ring, and a is an integer from 0 to 12, and preferably from 1 to 8.

The amount of acrylate monofunctional reactive monomers preferably ranges from 4 to 40 wt. %, more preferably from 10 to 35 wt. % and most preferred from 15 to 30 wt. %.

Examples of vinyl monofunctional reactive monomers are N-vinylpyrrolidone, N-vinyl caprolactam, vinylimidazole, vinylpyridine, and the like.

These N-vinyl monomers preferably are present in amounts from about 1 to about 20% by weight, more preferably from about 2 to about 10% by weight, and most preferred ranging from 3 to 7% by weight.

A suitable radiation-curable composition comprises from about 5 to about 60 wt. % of at least one radiation-curable diluent. Preferred amounts of the radiation-curable diluent include from about 12 to about 45 wt. %, more preferably from about 18 to about 37 wt. %, based on the total weight of the coating composition.

Generally, each reactive monomer has a molecular weight of less than about 550 and a viscosity of less than about 500 mPa·s.

A radiation-curable composition to be applied as a coating system consisting of a single coating layer on an optical fiber according to the invention also contains one or more multifunctional reactive monomers (iii).

The multifunctional reactive monomer can be a low viscosity monomer having two or more functional groups capable of polymerization when exposed to actinic radiation. For example, the viscosity of the low viscosity diluent monomer is from 50 to 500 centipoise at 25° C. The functional group may be of the same nature as that used in the radiation-curable oligomer. For example, the functional group of each reactive monomer is capable of copolymerizing with the radiation-curable functional group present on the other radiation-curable monomers or oligomer.

Multifunctional reactive monomers can have one, preferably two or three (meth)acrylate moieties.

Examples of multifunctional reactive monomers include: $C_2$-$C_{18}$ hydrocarbondiol diacrylates, $C_4$-$C_{18}$ hydrocarbon divinylethers, $C_3$-$C_{18}$ hydrocarbon triacrylates, and the polyether analogues thereof, and the like, such as 1,6-hexanedioldiacrylate, trimeth-ylolpropane triacrylate, hexanediol divinylether, triethyleneglycol diacrylate, pentaerythritol triacrylate, ethoxylated bisphenol-A diacrylate, and tripropyleneglycol diacrylate.

Preferably, alkoxylated aliphatic polyacrylates are used, such as ethoxylated hexanedioldiacrylate, propoxylated glyceryl triacrylate or propoxylated trimethylol propane triacrylate.

Preferred examples of diacrylates are alkoxylated aliphatic glycol diacrylate, more preferably, propoxylated aliphatic glycol diacrylate. A preferred example of a triacrylate is trimethylol propane triacrylate.

According to a preferred embodiment the polymeric material applied as single layer coating on an optical fiber according to the invention is made from a radiation curable composition which comprises a multifunctional reactive monomer in amounts of from 1 to 30 wt. %, more preferably ranging from 5 to 25 wt. %, and most preferably from 10 to 20 wt. %.

It is further preferred that the radiation curable composition comprises a mixture of at least two monofunctional reactive monomers, more preferably, one of said reactive monomers being substituted with a long aliphatic chain; even more preferably, the composition contains a long aliphatic chain-substituted monoacrylate and a N-vinyl monofunctional monomer. Preferably, at least about 10 wt. %, more preferably at least about 12 wt. % is present of said at least one long aliphatic chain-substituted monoacrylate.

A radiation-curable composition to be applied as a coating system consisting of a single coating layer on an optical fiber according to the invention also contains an adhesion promoter (iv). The adhesion promoter (iv) according to the invention is based on one or more adhesion agents. According to a preferred embodiment, the adhesion promoter (iv) comprises at least one organo-functional silane as adhesion agent.

Examples of adhesion agents include aminopropyltriethoxy-silane, mercaptopropyltrimethoxysilane, methacryloxypropyltri-methoxysilane, tris[3-(trimethoxysilyl)propyl] isocyanurate and commercially available products such as SH6062, SH6030 (manufactured by Toray-Dow Corning Silicone Co., Ltd.), and KBE903, KBE603, KBE403 (manufactured by Shin-Etsu Chemical Co., Ltd.).

According to a preferred embodiment the polymeric material applied as coating system on an optical fiber according to the invention is made from a radiation curable composition comprising an adhesion promoter in amounts higher than 5.0 wt. %, preferably higher than 9 wt. %. In a preferred embodiment the amount of adhesion promoter is lower than 12 wt. %.

A curable composition suitable to be applied as coating system on an optical fiber according to the present invention can be cured by radiation. Here, radiation includes infrared radiation, visible rays, ultraviolet radiation, X-rays, electron beams, α-rays, β-rays, γ-rays, and the like. Visible and UV radiation are preferred.

The radiation curable composition suitable to be applied as single coating layer on an optical fiber according to the present invention preferably comprises a photo-polymerization initiator. In addition, a photosensitizer can be added as required. The photo-polymerization initiator can be a composition comprising, for example, at least one of 1-hydroxy-cyclohexylphenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl methyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothio-xanthone, 2-methyl-1-[4-(methylthio)phenyl]-2-morpholino-propan-1-one, 2,4,6-trimethylbenzoyldiphenylphosphine oxide, bis-(2,6-dimethoxybenzoyl)-2,4,4-trimethylpentylphosphine oxide, bis-(2,4,6-trimethylbenzoyl)-phenylphosphine oxide and the like.

Examples of commercially available products of the photo-polymerization initiator include IRGACURE 184, 369, 651, 500, 907, CGI1700, 1750, 1850, 819, Darocur I116, 1173 (manufactured by Ciba Specialty Chemicals Co., Ltd.), Lucirin LR8728 (manufactured by BASF), Ubecryl P36 (manufactured by UCB), and the like.

The amount of the photo polymerization initiator used can range from 1 to 10 wt %, and preferably from 2 to 5 wt %, of the total amount of the components for the radiation curable composition.

In addition to the above-described components, various additives such as antioxidants, UV absorbers, light stabilizers, coating surface improvers, heat polymerization inhibitors, leveling agents, surfactants, colorants, preservatives, plasticizers, lubricants, solvents, fillers, aging preventives, and wettability improvers can be used in the radiation curable composition useful in the present invention, as required. Examples of antioxidants include Irganox 1010, 1035, 1076, 1222 (manufactured by Ciba Specialty Chemicals Co., Ltd.), Antigene P, 3C, FR, Sumilizer GA-80 (manufactured by Sumitomo Chemical Industries Co., Ltd.), and the like; examples of UV absorbers include Tinuvin P, 234, 320, 326, 327, 328, 329, 213 (manufactured by Ciba Specialty Chemicals Co., Ltd.), Seesorb 102, 103, 110, 501, 202, 712, 704 (manufactured by Sypro Chemical Co., Ltd.), and the like; examples of light stabilizers include Tinuvin 292, 144, 622LD (manufactured by Ciba Specialty Chemicals Co., Ltd.), Sanol LS770 (manufactured by Sankyo Co., Ltd.), Sumisorb TM-061 (manufactured by Sumitomo Chemical Industries Co., Ltd.), and the like.

The viscosity at application of the radiation curable composition used as coating system on an optical fiber according to the present invention is lower than 4000 mPa·s, preferably lower than 3800 mPa·s, and more preferably lower than 3600 mPa·s. According to the most preferred embodiment of the present invention the viscosity of the liquid radiation curable composition ranges from 2800 mPa·s to 3600 mPa·s. Said viscosity values enable a good adhesion of the curable composition to the glass core such that industrially suitable speed drawing can be set in the manufacturing of the optical fiber of the invention. The resulting adhesion between the single coating layer and the glass core prevents the formation of delamination and bubbles, for example in the presence of moisture.

The coating compositions suitable to be applied as a coating system on an optical fiber according to the present invention, when cured, typically have an elongation at break of greater than 50%, preferably of at least 60%. For example, the elongation at break has a maximum value of 120-130%, preferably equal to or lower than 100%.

The compositions suitable to be applied as coating system on an optical fiber according to the present invention will preferably have a cure speed of 1.0 J/cm$^2$ (at 95% of maximum attainable modulus) or less, more preferably about 0.7 J/cm$^2$ or less, and more preferably, about 0.5 J/cm$^2$ or less, and most preferred, about 0.4 J/cm$^2$ or less.

Figure 2:
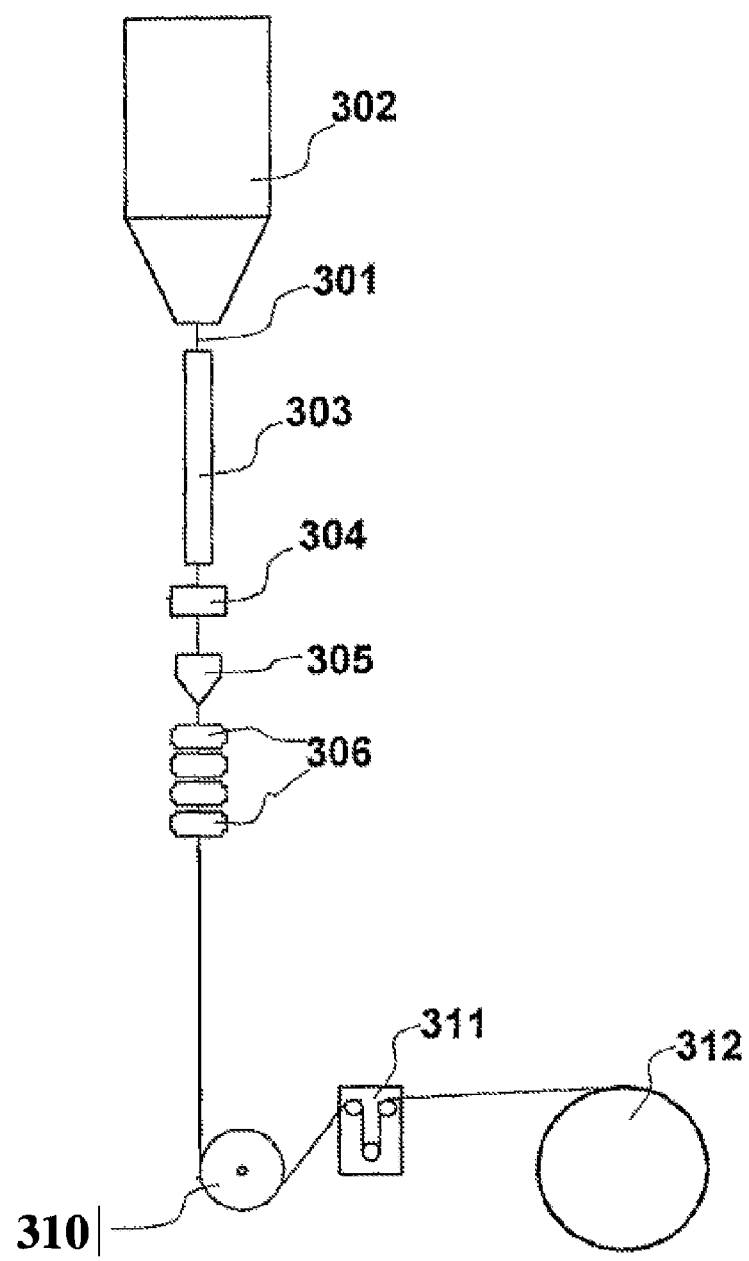
FIG. 2 shows an illustrative embodiment of a drawing tower for manufacturing an optical fiber according to the invention.

An optical fiber according to the present invention may be produced according to usual drawing techniques, using, for example, a system such as the one schematically illustrated in FIG. 2.

This system, commonly known as "drawing tower", typically comprises a furnace (302) inside which a glass optical preform to be drawn is placed. The bottom part of the said preform is heated to the softening point and drawn into an optical fiber (301). The fiber is then cooled, preferably down to a temperature of not more than 60° C., more preferably at room temperature, preferably in a suitable cooling tube (303) of the type described, for example, in patent application WO 99/26891, and passed through a diameter measurement device (304). Then, the fiber passes through a coating applicator (305), containing the coating composition in liquid form, and is covered with this composition to the desired thickness. The coated fiber is then passed through a UV oven (or a series of ovens) (306) in which the coating is cured.

Subsequent to the coating and to the curing, the fiber may optionally be caused to pass through a device capable of giving a predetermined torsion to this fiber, for example of the type described in international patent application WO 99/67180, for the purpose of reducing the PMD ("Polarization Mode Dispersion") value of this fiber. The pulley (310) placed downstream of the devices illustrated previously controls the spinning speed of the fiber. After this drawing pulley, the fiber passes through a device (311) capable of controlling the tension of the fiber, of the type described, for example, in patent application EP 1 112 979, and is finally collected on a reel (312).

An optical fiber thus produced may be used in the production of optical cables. The fiber may be used either as such or in the form of ribbons comprising several fibers combined together by means of a common coating.

Examples

The present invention will be explained in more detail below by way of examples, which are not intended to be limiting of the present invention.

Coating Compositions

Coating compositions have been prepared to be applied as a coating system consisting of a single coating layer on an optical fiber. The compositions to be applied as a coating system on an optical fiber according to the invention are indicated as Examples Ex.3 and Ex.4 in the following table 1.

TABLE 1

Radiation curable primary coating compositions

|  |  | Ex. 1* (Wt. %) | Ex. 2* (Wt. %) | Ex. 3 (Wt. %) | Ex. 4 (Wt. %) |
|---|---|---|---|---|---|
| Urethane acrylate oligomer | A | 49.10 | 51.00 | 48.70 | 49.20 |
| 2,4,6-trimethyl-benzoyldiphenylphosphin oxide | B | 1.3 | 1.3 | 1.3 | 1.3 |
| 1-hydroxy cyclohexyl phenyl ketone |  | 1.9 | 1.9 | 1.8 | 1.8 |
| Thiodiethylene bis([3-(3,5-di-tert-4-hydroxyphenyl)propionate] | C | 0.30 | 0.30 | 0.30 | 0.30 |
| Vinylcaprolactam |  | 4.8 | 4.6 | 4.4 | 4.4 |
| Isodecyl acrylate | D | 19.0 | 20.0 | 19.0 | 19.0 |
| Trimethylolpropane triacrylate | E | 18.30 | 14.80 | 14.10 | 14.20 |
| Mercaptopropyltrimethoxy silane | F | 1.0 | 1.0 | 1.8 | 1.8 |
| Tetraethoxy silane |  | 2.4 | 2.4 | 4.6 | 4.6 |
| Tris[3-(trimethoxysilyl)propyl]isocianurate |  | 1.5 | 1.5 | 2.8 | 2.8 |
| Silicone polyether acrylate | G | 0.50 | 1.00 | 1.00 | — |

*comparison composition
A - Oligomer reaction product of isophorone diisocyanate (IPDI), 2-hydroxyethylacrylate (HEA), polyoxytetramethylene glycol (PTMG 2000) and polyoxy-3-methyltetramethylene glycol (3-$CH_3$ PTMG 2000);
B - photoinitiator package;
C - stabilizer
D - monofunctional monomers;
E - multifunctional monomer;
F - adhesion promoters;
G - surface active agents (releasing agent).

The viscosity, the mechanical properties, and the elastic modulus E' for each of the above cured coating compositions were as given in Table 2 (see test method section for details on DMA test and determination of respective parameters on the DMA curve).

TABLE 2

Parameters of cured coating compositions

|  |  | Ex. 1 | Ex. 2 | Ex. 3 | Ex. 4 |
|---|---|---|---|---|---|
| Viscosity | MPa·s | 4400 | 5260 | 3510 | 3470 |
| Tensile strength | Mpa | 8 | 7 | 8 | 8 |
| Elongation | % | 31 | 48 | 60 | 65 |
| E' at −40° C. | Mpa | 261 | 240 | 234 | 250 |
| E' at 40° C. | Mpa | 33 | 23 | 17 | 18 |
| E' at 90° C. | Mpa | 19 | 11 | 10 | 10 |

Preparation of Optical Fibers and Evaluation Thereof

Coated single mode optical fibers have been manufactured as indicated in the test method section, by using the compositions of Examples 1-4 as single coating layer.

Reference optical fiber F1 manufactured by application of a single coating layer the composition of Example 1 showed poor adhesion between coating material and glass. A pull out test resulted to be 0 N/cm, i.e. the coating can be easily removed from the glass portion of the optical fiber. In addition, the optical fiber had eccentricity problem even at a drawing speed of 5 m/s.

The same poor adhesion between coating material and glass was shown by reference optical fiber F2 manufactured by application of a single coating layer the composition of Example 2.

Optical fibers F3 and F4 manufactured by application of single coating layer made of the composition of Example 3 and 4, respectively provide good response at the strip-force test typically higher than 2 N. No eccentricity was observed at drawing speed of 18 m/s.

Microbending Tests

The results of the microbending test (see details in the test methods section) on single mode optical fibers are reported in the following table 4.

TABLE 4

Microbending on Single Mode fibers

| Fiber | Microbending Sensitivity (dB/Km)/(g/mm) | | |
|---|---|---|---|
|  | −30° C. | +22° C. | +60° C. |
| F1 | 9.2 | 6.3 | 6.8 |
| F4 | 5.9 | 3.9 | 3.1 |

As shown by the above results, an optical fiber according to the invention is less prone to attenuation losses caused by the microbending phenomenon, both at the low as well as high operating temperatures.

Ageing Tests

The results of the ageing tests (see details in the test method section) on single mode optical fibers are reported in the following table 5.

Water soak at 20° C.: 30 days, daily measured;
Water soak at 60° C.: 30 days, daily measured;
Dry heat at 85° C.: 30 days, daily measured;
Damp Heat (in jelly): 30 days, measurement being effected at the beginning and at the end of the ageing period (attenuation at 20° C., −30° C., +60° C., −30° C., +60° C., +20° C.).

TABLE 5

Ageing tests

| Fiber | Water soak at 20° C. | Water soak at 60° C. | Dry heat at 85° C. | Damp heat at 85° C./85% RH |
|---|---|---|---|---|
| F1 | Not passed | Not passed | Not passed | Not passed |
| F2 | Passed | Passed | Passed | Not passed |
| F3 | Passed | Passed | Passed | Passed |
| F4 | Passed | Passed | Passed | Passed |

F1 suffered from delamination of the single coating layer and bubble formation; attenuation increased after 15 days was observed.

In the damp heat test, F2 did not pass because showed a drop in the pull-out test (from 1.7 to 1.1 as an average; in some point the force was 0, i.e. the coating delaminated from the glass). In addition, the single coating of F2 was sensible in the presence of solvents or jelly (typically used as filling material in a buffer tube). The behavior was not improved in the presence of a colored ink covering the single coating.

Curing of the Coating Compositions for Mechanical Testing (Sample Preparation)

A drawdown of the material to be tested was made on a glass plate and cured using a UV processor in inert atmosphere (with a UV dose of 1 J/cm$^2$, IL-309 by Fusion D-lamp). The cured film was conditioned at 23±2° C. and 50±5% RH for a minimum of 16 hours prior to testing.

A minimum of 6 test specimens having a width of 12.7 mm and a length of 12.5 cm were cut from the cured film.

Viscosity Testing

Viscosity values are measured with a Brookfield viscometer. Maximum accuracy is obtained by selecting a spindle and a rotational velocity (RPM) that result in readings in the highest part of the Brookfield scale. The equipment is a Brookfield viscometer, model RVT or RVTD. The temperature is guaranteed constant at 25±0.2° C. The viscosity is measured in mPa*s.

Dynamic Mechanical Testing

The DMA testing has been carried out in tension according to the following methodology.

Test samples of the cured coating compositions of examples 1-4 were measured using a Rheometrics Solids Analyzer (RSA-11), equipped with:
1) a personal computer having a Windows operating system and having RSI Orchestrator® software (Version V.6.4.1) loaded, and
2) a liquid nitrogen controller system for low-temperature operation.

The test samples were prepared by casting a film of the material, having a thickness in the range of 0.02 mm to 0.4 mm, on a glass plate. The sample film was cured using a UV processor. A specimen approximately 35 mm (1.4 inches) long and approximately 12 mm wide was cut from a defect-free region of the cured film. For soft films, which tend to have sticky surfaces, a cotton-tipped applicator was used to coat the cut specimen with talc powder.

The film thickness of the specimen was measured at five or more locations along the length. The average film thickness was calculated to ±0.001 mm. The thickness cannot vary by more than 0.01 mm over this length. Another specimen was taken if this condition was not met. The width of the specimen was measured at two or more locations and the average value calculated to ±0.1 mm.

The geometry of the sample was entered into the instrument. The length field was set at a value of 23.2 mm and the measured values of width and thickness of the sample specimen were entered into the appropriate fields.

Before conducting the temperature sweep, moisture was removed from the test samples by subjecting the test samples to a temperature of 80° C. in a nitrogen atmosphere for 5 minutes. The temperature sweep used included cooling the test samples to about −60° C. or about −90° C. and increasing the temperature at about 2° C./minute until the temperature reached about 100° C. to about 120° C. The test frequency used was 1.0 radian/second. In a DMTA measurement, which is a dynamic measurement, the following moduli are measured: the storage modulus E' (also referred to as elastic modulus), and the loss modulus E" (also referred to as viscous modulus). The lowest value of the storage modulus E' in the DMTA curve in the temperature range between 10 and 100° C. measured at a frequency of 1.0 radian/second under the conditions as described in detail above is taken as the equilibrium modulus of the coating.

Manufacturing of Optical Fibers

All the optical fibers used in the present experimental section has been manufactured according to standard drawing techniques, by applying a coating system composition on the drawn optical fiber and curing said coating composition. The fiber is drawn at a speed of about 20 m/s and the cure degree of the coating layers is of at least 90%. The cure degree is determined by means of MICRO-FTIR technique, by determining the percentage of the reacted acrylate instaurations in the final cross-linked resin with respect to the initial photo-curable composition (e.g. as described in WO 98/50317).

Microbending Tests

Microbending effects on optical fibers were determined by the "expandable drum method" as described, for example, in G. Grasso and F. Meli "Microbending losses of cabled single-mode fibers", ECOC '88, pp. 526-ff, or as defined by IEC standard 62221 (Optical fibers—Measurement methods—Microbending sensitivity—Method A, Expandable drum; October 2001). The test is performed by winding a 100 m length fiber with a tension of 55 g on a 300 mm diameter expandable metallic bobbin, coated with rough material (3M Imperial® PSA-grade 40 µm).

The bobbin is connected with a personal computer which controls:
the expansion of the bobbin (in terms of variation of fiber length); and
the fiber transmission loss.

The bobbin is then gradually expanded while monitoring fiber transmission loss versus fiber strain.

The pressure exerted onto the fiber is calculated from the fiber elongation by the following formula:

$$p = \frac{EA\varepsilon}{R}$$

where E is the elastic modulus of glass, A the area of the coated fiber and R the bobbin radius.

For each optical fiber, the MAC has been determined as follows:

$$MAC = \frac{MFD}{\lambda_{co}}$$

where MFD (mode field diameter according Petermann definition) at 1550 nm and $\lambda_{co}$ (lambda fiber cutoff—2 m length) are determined according to standard ITUT G650.

Ageing Tests

The aging tests have been performed by maintaining the fiber samples for 30 days under different conditions. The water soak tests have been performed by immersing the optical fiber in water at 20° C. and at 60° C. The dry heat test has been performed by maintaining the optical fiber at 85° C. in dry conditions (relative humidity lower 30%). The damp heat test has been performed by maintaining the optical fiber at 85° C. at 85% relative humidity.

Strip-Force Test

The stripping-force value has been measured using a tensile machine with a load cell of 10 kg. The sample length is 30 mm and the stripper speed is 10 mm/min. We have used a lower speed, if compared with the one required by IEC 60793-1-32 because in this way the test is more severe (a degradation of primary coating is more evident).

Pull-Out Test

In order to evaluate the pull-out force (which is a sign of the adhesion between the glass and the primary coating), 10 mm sample is fixed to a metal plate by hardening bicomponent glue. The hardening time is about 5 minute at room temperature. The speed of the tensile machine is 10 mm/min.

The invention claimed is:

1. An optical fiber comprising a glass core and a protective coating consisting of a single coating layer disposed to surround said glass core, wherein said single coating layer is formed from a cured polymeric material obtained by curing a radiation curable composition comprising (i) a radiation curable urethane (meth)acrylate oligomer, or a radiation curable urethane (meth)acrylate oligomer comprising a backbone derived from polyoxytetramethylene glycol; (ii) at least one monofunctional reactive monomer; (iii) at least one multifunctional reactive monomer; and (iv) an adhesion promoter, said radiation curable composition having a viscosity ranging from 2800 mPa·s to 3600 mPa·s, said polymeric material having a tensile modulus at 40° C. less than 20 MPa and a tensile modulus at −40° C. less than 300 MPa.

2. The optical fiber according to claim 1, wherein the single coating layer has a thickness of 25 μm to 65 μm.

3. The optical fiber according to claim 1, comprising a color coating in a radial external position with respect to the protective coating.

4. The optical fiber according to claim 1, wherein said cured polymeric material has a glass transition temperature not greater than about −80° C.

5. The optical fiber according to claim 1, having a microbending sensitivity at 1550 nm in a temperature range of −30° C. to 60° C. of less than 7 (dB/km)(g/mm) when subjected to an expandable drum microbending test.

6. The optical fiber according to claim 1, comprising a standard single mode fiber.

7. The optical fiber according to claim 1, wherein said cured polymeric material has an elongation at break greater than 50%.

8. The optical fiber according to claim 1, wherein said cured polymeric material has an elongation at break equal to or less than 100%.

9. An optical fiber comprising a glass core and a protective coating consisting of a single coating layer disposed to surround said glass core, wherein said single coating layer is made of a cured polymeric material, obtained by curing a radiation curable composition comprising (i) a radiation curable urethane (meth)acrylate oligomer, or a radiation curable urethane (meth)acrylate oligomer comprising a backbone derived from polyoxytetramethylene glycol, (ii) at least one monofunctional reactive monomer, (iii) at least one multifunctional reactive monomer, and (iv) an adhesion promoter in an amount greater than 5 wt. % of the total amount of said radiation curable composition, said radiation curable composition having a viscosity ranging from 2800 mPa·s to 3600 mPa·s, said single coating layer having a tensile modulus at 40° C. less than 20 MPa and a tensile modulus at −40° C. less than 300 MPa.

10. The optical fiber according to claim 9, wherein said radiation curable composition comprises an adhesion promoter in an amount greater than 9 wt. % of the total amount of said radiation curable composition.

11. The optical fiber according to claim 10, wherein said radiation curable composition comprises an adhesion promoter in an amount less than 12 wt. % of the total amount of said radiation curable composition.

12. The optical fiber according to claim 9, wherein said urethane (meth)acrylate oligomer has a number average molecular weight of 1,200 to 20,000 g/mol.

13. The optical fiber according to claim 9, wherein said radiation curable composition comprises 2080 wt. % of said urethane (meth)acrylate based on the total amount of the composition.

14. The optical fiber according to claim 9, wherein said radiation curable composition comprises 10 to 50 wt. % of said at least one monofunctional reactive monomer based on the total amount of the composition.

15. The optical fiber according to claim 9, wherein said radiation curable composition comprises 1-30 wt. % of said at least one multifunctional reactive monomer based on the total amount of the composition.

* * * * *